Dec. 7, 1937.　　　A. D. MOORE　　　2,101,186
LIGHT SIGNAL
Filed Aug. 6, 1936
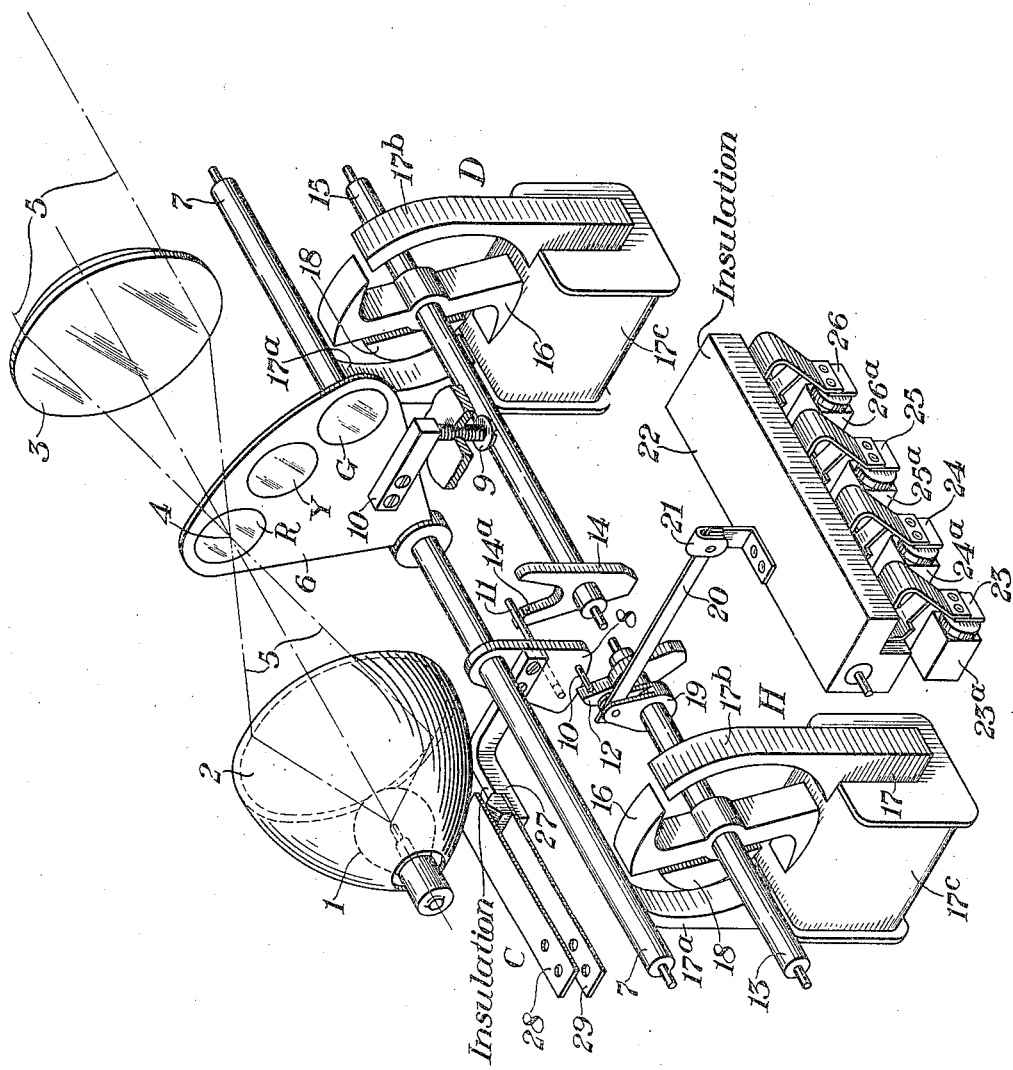
INVENTOR
*Alexander Davis Moore*
BY
*HIS* ATTORNEY Patented Dec. 7, 1937

2,101,186

UNITED STATES PATENT OFFICE 2,101,186

LIGHT SIGNAL

Alexander Davis Moore, Merwood, Pa., assignor to The Union Switch & Signal Company, Swissvale, Pa., a corporation of Pennsylvania Application August 6, 1936, Serial No. 94,613

3 Claims. (Cl. 177—327)

My invention relates to light signals, and particularly to light signals which are capable of selectively projecting a plurality of beams of light of different colors from a single light source.

I will describe one form of signal embodying my invention, and will then point out the novel features thereof in claims.

The accompanying drawing is a view, partly in isometric projection and partly diagrammatic, showing one form of light signal embodying my invention.

Referring to the drawing, the signal in the form here shown comprises a suitable optical assembly consisting of an electric lamp 1, a reflector 2, and an objective lens 3 so disposed that the reflector 2 will collect a large percentage of the rays of light emitted by the lamp 1 and cause them to converge at a focal point 4, and then diverge in order to cover the surface of the objective lens 3, as indicated by the dash lines 5. The various parts of the optical assembly are all of well-known construction, and are illustrated in the drawing in diagrammatic form in order to simplify the disclosure.

Associated with the optical assembly is operating mechanism embodying my present invention for varying the character of the light rays emitted by the signal. As here illustrated, this operating mechanism comprises a spectacle arm 6, the upper end of which is provided with three differently colored filters R, Y, and G. The spectacle arm 6 is secured at its lower end to a pivoted shaft 7, and is capable of being moved from a stop position in which the filter R is interposed in the path of the light rays adjacent the focal point 4, a caution position in which the filter Y is interposed in the path of the light rays adjacent the focal point 4, and a proceed position in which the filter G is interposed in the path of the light rays adjacent the focal point 4. It will be apparent that when one of the filters is located in the path of the light rays, the light rays will pass through the filter, so that only the light rays of the color which are not filtered out can emerge from the signal. Since the filters are differently colored, it follows that the signal is capable of displaying three different aspects depending upon which of the filters is located at the focal point 4. In the practical application of a light signal embodying my invention to railway signaling, the spectacle arm is biased by its own weight, and by the weight of a depending operating member 8 which is secured to the shaft 7, to its stop position, and the filter R is colored red so that when the spectacle arm occupies its stop position, the projected beam will be red, indicating "stop". Furthermore, the filter Y is colored yellow and the filter G is colored green so that when the arm occupies its caution position, the beam will be yellow, indicating "caution", and when the arm occupies its proceed position, the beam will be green, indicating "proceed". The spectacle arm is prevented from moving beyond its stop position in response to the bias of the biasing means by an adjustable stop screw 9 which cooperates with a stop member 10 secured to the spectacle arm.

Secured to the operating member 8 are two laterally projecting pins 10 and 11 which cooperate respectively with an operating dog 12 secured to the pivoted armature shaft 13 of a Z-armature type home magnet H, and with an operating dog 14 secured to the pivoted armature shaft 15 of a Z-armature type distant magnet D. The two magnets D and H are of wellknown construction, and each comprises the usual Z-type armature 16 mounted to oscillate between the pole pieces 17ᵃ and 17ᵇ of a field core 17 which is arranged to be energized by a suitable winding 17ᶜ. The two armatures 16 are each biased to their deenergized positions in which they are shown in the drawing by suitable weights 18, and both the armatures and associated field cores are preferably laminated to permit the magnets to be operated on either alternating or direct current. The dog 12 is so arranged and the parts are so proportioned that when the armature 16 of the home magnet H occupies its deenergized position, the dog 12 will not interfere with the movement of the spectacle arm to its stop position, but that, when the armature of the home magnet is moved from its deenergized position to its energized position, the dog 12 will then cooperate with the pin 10 to move the spectacle arm 6 from its stop position to its caution position. The dog 14 is bifurcated at its upper end and is so arranged and the parts are so proportioned that when the spectacle arm 6 occupies its stop position and the armature 16 of the distant magnet D occupies its deenergized position, the pin 11 will overlie the upper end of the bifurcation 14ᵃ of the dog 14 in such manner that rotation of the armature 16 away from its stop position is prevented, but that movement of the spectacle arm to its caution position by energization of the home magnet H will move the pin 11 to such a position between the two bifurcations that, if the distant magnet D then becomes energized, the bifurcation 14ᵃ of the dog 14 will cooperate with the pin 11 to rotate the spectacle arm 6 from its caution to its proceed position. It will be seen, therefore, that the spectacle arm will occupy its stop, caution, or proceed position according as the home and distant magnets are both deenergized, the home magnet is energized and the distant magnet is deenergized, or as the home and distant magnets are both energized.

The home magnet H in addition to being operatively connected with the spectacle arm 6 in the manner just described, is also operatively connected by means of a crank 19, a link 20, and an arm 21 with a pivoted contact carrying rocker 22. This rocker is of suitable insulating material, and has secured thereto a plurality of flexible contact fingers, here shown as four in number, and designated by the reference characters 23, 24, 25, and 26. The contact fingers 23, 24, 25, and 26 cooperate with fixed contact members 23a, 24a, 25a, and 26a, respectively, to form contacts 23—23a, 24—24a, 25—25a, and 26—26a, the parts being so proportioned that these contacts will be open or closed according as the armature of the home magnet occupies its release position in which it is shown in the drawing, or its attracted position.

The operating mechanism also includes a checking contact C for indicating when the spectacle arm occupies its stop position. This checking contact is arranged to be operated by an arm 27 of suitable insulating material which arm is secured to the operating member 8, and in the form here shown this contact comprises two flexible contact fingers 28 and 29 so arranged that the finger 29 is biased by its own resiliency to a position in which it is out of engagement with the finger 28, but that, the finger 29 will be moved into engagement with the finger 28 by means of the insulating arm 27 whenever the spectacle arm occupies its stop position.

The operation of the signal as a whole will be apparent from an inspection of the drawing and from the foregoing description without further detailed description. It should be particularly pointed out, however, that due to the fact that the yellow filter Y is located between the red and green filters, the signal will not display a momentary red aspect when changing from yellow to green or green to yellow, as would be the case if the red filter were disposed between the yellow and green filters in the customary manner. This is a distinct advantage because in many instances it is essential that the engineer of the train should apply the brakes immediately when a stop or red signal occurs, and it is believed that, if a red flash were permitted to occur each time the signal changed from yellow to green or green to yellow, the engineer might unconsciously hesitate long enough before applying the brakes when the signal normally changed to stop, to see if the stop indication would be permanent. Furthermore, in other instances the engineer upon seeing a momentary red flash might make an unnecessary application of the brakes, thus causing undesirable delays and undue wear to the railway equipment.

Another advantage of a signal embodying my invention is that it will operate equally well on either alternating or direct current.

Although I have herein shown and described only one form of light signal embodying my invention, it is understood that various changes and modifications may be made therein within the scope of the appended claims without departing from the spirit and scope of my invention.

Having thus described my invention, what I claim is:

1. A light signal comprising a spectacle arm secured to a first pivoted shaft and biased to a stop position and rotatable from its stop position to caution and proceed positions, an operating member secured to said shaft in such manner that said member assists in biasing said spectacle arm to its stop position, two laterally projecting pins secured to said operating member, a first electromagnet having its armature secured to a second pivoted shaft, a second electromagnet having its armature secured to a third pivoted shaft, both said armatures being biased to deenergized positions, a first dog secured to said second shaft and cooperating with a first one of said pins in such manner that movement of the armature of said first electromagnet from its deenergized to its energized position will rotate said spectacle arm from its stop to its caution position, and a second dog secured to said third shaft and cooperating with the other pin in such manner that movement of the armature of said second electromagnet from its deenergized to its energized position will rotate said spectacle arm from its caution to its proceed position.

2. A light signal comprising a first pivoted shaft, a spectacle arm secured to said first shaft for rotation from a stop position to a proceed position through a caution position and biased by its own weight to its stop position, an operating member secured to said shaft and provided with two laterally projecting pins, a second and a third pivoted shaft, a first electromagnet having its armature secured to said second shaft in such manner that rotation of such armature from its deenergized to its energized position will rotate said second shaft from a first to a second position, a second electromagnet having its armature secured to said third shaft in such manner that rotation of such armature from its deenergized to its energized position will rotate said third shaft from a first to a second position, means for biasing said second and third shafts to their first positions, a first dog secured to said second shaft and cooperating with one of said pins in such manner that rotation of said second shaft from its first position to its second position will rotate said spectacle arm from its stop to its caution position, and a second dog secured to said third shaft and cooperating with the other pin in such manner that rotation of said third shaft from its first position to its second position will rotate said spectacle arm from its caution to its proceed position.

3. A light signal comprising a spectacle arm secured to a first pivoted shaft and biased to a stop position and rotatable from its stop position to caution and proceed positions, an operating member secured to said shaft in such manner that said member assists in biasing said spectacle arm to its stop position, two laterally projecting pins secured to said operating member, a first electromagnet having its armature secured to a second pivoted shaft, a second electromagnet having its armature secured to a third pivoted shaft, both said armatures being biased to deenergized positions, a first dog secured to said second shaft and cooperating with a first one of said pins in such manner that movement of the armature of said first electromagnet from its deenergized to its energized position will rotate said spectacle arm from its stop to its caution position, a second dog secured to said third shaft and cooperating with the other pin in such manner that movement of the armature of said second electromagnet from its deenergized to its energized position will rotate said spectacle arm from its caution to its proceed position.

ALEXANDER DAVIS MOORE.